United States Patent
Lilieholm et al.

(10) Patent No.: US 9,810,369 B2
(45) Date of Patent: Nov. 7, 2017

(54) MOUNTING BRACKET FOR A PLURALITY OF SUPPORT STRUCTURES

(71) Applicant: CommScope Italy S.r.l., Agrate Brianza (IT)

(72) Inventors: Erik William Lilieholm, Richardson, TX (US); Juan Jose Irola Borja, Allen, TX (US)

(73) Assignee: CommScope Italy S.R.L., Agrate Brianza (IT)

( * ) Notice: Subject to any disclaimer, the term of this patent is extended or adjusted under 35 U.S.C. 154(b) by 597 days.

(21) Appl. No.: 13/914,371

(22) Filed: Jun. 10, 2013

(65) Prior Publication Data

US 2014/0252185 A1    Sep. 11, 2014

Related U.S. Application Data

(60) Provisional application No. 61/774,714, filed on Mar. 8, 2013.

(51) Int. Cl.
*A47F 5/00*     (2006.01)
*F16M 13/02*    (2006.01)
*H01Q 1/12*     (2006.01)

(52) U.S. Cl.
CPC ........ *F16M 13/022* (2013.01); *H01Q 1/1207* (2013.01)

(58) Field of Classification Search
CPC .... Y10S 248/906; H02G 3/32; H05K 5/0204; H05K 7/14
USPC ...... 248/300, 218.4, 219.4, 219.1, 214, 518, 248/558, 535, 911, 912, 200, 205.1; 174/58, 52.1, 50, 45 R; 220/3.8, 4.02, 220/3.2, 3.9
See application file for complete search history.

(56) References Cited

U.S. PATENT DOCUMENTS

| | | | | |
|---|---|---|---|---|
| 1,938,818 A | * | 12/1933 | Erickson | A47K 3/008 248/300 |
| 2,961,209 A | * | 11/1960 | Willey | A01K 97/10 248/515 |
| 3,185,424 A | * | 5/1965 | Sloop | H01F 27/06 248/205.1 |
| 3,187,084 A | | 6/1965 | Stillman et al. | |
| 3,251,333 A | * | 5/1966 | Smenner | B63H 21/265 248/300 |

(Continued)

FOREIGN PATENT DOCUMENTS

WO    WO2011119613 A1    9/2011

*Primary Examiner* — Kimberly Wood
(74) *Attorney, Agent, or Firm* — Myers Bigel, P.A.

(57) ABSTRACT

A bracket for mounting a device to support structure has (i) a first side and (ii) second and third sides that extend perpendicularly from opposite edges of the first side in the same direction, such that the second and third sides are parallel to each other. The bracket supports a first mounting configuration in which the first side is attached to a face of the device and the second side is attached to a plane of the support structure such that the side of the device is perpendicular to the plane of the support structure. The bracket also supports a second mounting configuration in which the third side is attached to the face of the device and the second side is attached to the plane of the support structure such that the face of the device is parallel to the plane of the support structure.

11 Claims, 11 Drawing Sheets

(56) References Cited

U.S. PATENT DOCUMENTS

| | | | | |
|---|---|---|---|---|
| 3,326,503 A * | 6/1967 | Bade | F16H 57/025 | 248/300 |
| 3,347,505 A * | 10/1967 | Menser | F16L 3/1008 | 248/218.4 |
| 3,704,001 A * | 11/1972 | Sloop | H02B 5/02 | 211/107 |
| 3,802,654 A * | 4/1974 | Jenko | H02G 3/065 | 174/72 A |
| 3,944,175 A * | 3/1976 | Kearney | F16L 3/227 | 248/201 |
| 3,992,798 A * | 11/1976 | Schmitt, Sr. | A01K 97/10 | 43/17 |
| 4,114,160 A * | 9/1978 | Verini | H01Q 1/3258 | 248/539 |
| 4,907,766 A * | 3/1990 | Rinderer | F16L 3/24 | 248/57 |
| 4,957,251 A * | 9/1990 | Hubbard | F16L 3/22 | 248/126 |
| 5,303,887 A * | 4/1994 | Hasty | F16L 3/227 | 248/67.5 |
| 5,730,522 A * | 3/1998 | Wyke | F21V 19/006 | 248/200 |
| 5,876,000 A * | 3/1999 | Ismert | E03C 1/021 | 248/65 |
| 6,229,948 B1 * | 5/2001 | Blee | G02B 6/483 | 385/134 |
| 6,337,438 B1 | 1/2002 | Oyamada | | |
| 6,486,399 B1 | 11/2002 | Armstrong et al. | | |
| 6,766,992 B1 * | 7/2004 | Parker | F16M 13/02 | 248/218.4 |
| 6,945,735 B1 * | 9/2005 | Doverspike | F16L 1/09 | 248/207 |
| 7,014,383 B2 * | 3/2006 | Schmid | E04B 1/2604 | 248/300 |
| 7,021,599 B2 * | 4/2006 | DeGrazia | H01H 71/70 | 248/645 |
| 7,229,051 B2 * | 6/2007 | Mailhot, Jr. | A61M 5/1418 | 211/70.6 |
| 7,621,494 B2 * | 11/2009 | Rees | H05K 7/183 | 248/300 |
| 7,823,846 B2 * | 11/2010 | Williams, III | F16L 5/00 | 248/200.1 |
| 2002/0195533 A1 * | 12/2002 | Gilberton | A47B 21/0314 | 248/316.1 |
| 2003/0116685 A1 * | 6/2003 | Jensen | A47B 3/0818 | 248/200 |
| 2004/0013098 A1 | 1/2004 | Tseng et al. | | |
| 2004/0035602 A1 | 2/2004 | White | | |
| 2004/0145867 A1 | 7/2004 | Tomino et al. | | |
| 2004/0189157 A1 | 9/2004 | Adams | | |
| 2004/0211456 A1 * | 10/2004 | Brown | F24J 2/5245 | 136/243 |
| 2005/0056743 A1 | 3/2005 | Ware et al. | | |
| 2005/0157453 A1 | 7/2005 | Chung et al. | | |
| 2008/0011919 A1 * | 1/2008 | Wen | F16M 11/04 | 248/219.4 |
| 2008/0219631 A1 | 9/2008 | Gronvall et al. | | |
| 2008/0245938 A1 | 10/2008 | Qualy et al. | | |
| 2010/0314514 A1 * | 12/2010 | Nelson | F16M 11/08 | 248/219.1 |
| 2011/0083399 A1 * | 4/2011 | Lettkeman | H01Q 1/1228 | 52/745.21 |

\* cited by examiner

MOUNTING BRACKET FOR A PLURALITY OF SUPPORT STRUCTURES

CROSS-REFERENCE TO RELATED APPLICATIONS

This application claims the benefit of the filing date of U.S. provisional application No. 61/774,714, filed on Mar. 8, 2013, the teachings of all of which are incorporated herein by reference in their entirety.

BACKGROUND OF THE INVENTION

Field of the Invention

The present invention relates to brackets, and, more specifically but not exclusively, to brackets for mounting a device to a plurality of different support structures.

Description of the Related Art

Increasing demand for mobile telecommunications services has prompted wireless operators to expand capacity by adding radio equipment to new and existing base station sites. Such additional equipment may use the same frequency bands and air interface standards that are already in operation at a base station site, or it may introduce other standards and frequency bands to operate alongside existing equipment at the base station site. In either case, it is often advantageous to let the new equipment share existing radio frequency (RF) infrastructure, such as antennas, amplifiers, and feeder cables. Such sharing is made possible by ancillary equipment, including but not limited to multi-band combiners, same-band combiners, amplifiers, interference mitigation filters, duplex filters, and the like.

The specific type and amount of such ancillary equipment that is installed at each site varies because the radio configuration may differ from site to site with respect to the operating frequency, the type of radio equipment, the number of antennas, and other factors. Further, the manner in which the ancillary equipment may be installed at each site is influenced by characteristics of site construction, such as the amount of space available, the relative positions of the radio equipment, the means of routing and supporting RF cables, and other factors. Thus, it is often not possible or practical to ascertain where and how ancillary equipment should be installed without first visiting the site.

Typically, ancillary equipment is fitted with fixed brackets that accommodate the mounting of a single unit of ancillary equipment to a (e.g., cylindrical or rectangular) pole within a range of diameters using band clamps or a flat surface (i.e., face) such as a wall or beam using threaded fasteners (e.g., nuts and bolts). When a method other than pole- or face-mounting is desired, it has been necessary to obtain additional mounting hardware or create ad-hoc constructions and/or modifications on site, causing additional labor and multiple site visits, and compromising the integrity of the equipment.

Furthermore, conventional brackets used to mount ancillary equipment typically intrude on the space immediately surrounding the coaxial connectors of the ancillary equipment. In outdoor installations, these connectors are weather-protected by wrapping several layers of adhesive tape and other materials around the connectors. As each turn of the tape requires passing the roll around the connector, the intruding bracket creates an obstruction that increases time to complete and jeopardizes the quality of the weather-proofing.

Therefore, there is a need to provide mounting hardware for ancillary equipment that enables a technician to accomplish installation with a single visit to the site and without knowing beforehand what installation method will be used. Further, there is a need for mounting hardware that does not interfere with customary weather-proofing installations.

SUMMARY OF THE INVENTION

In one embodiment, the present invention is a bracket for mounting a device to support structure, the bracket comprising first through third sides. The second side extends perpendicularly from a first edge of the first side in a first direction. The third side extends perpendicularly from a second edge of the first side, opposite the first edge, and in the first direction, such that the third side is substantially parallel to the second side. Further, the bracket is configured to support at least first and second mounting configurations of the device to the support structure. In the first mounting configuration, the first side is attached to a face of the device and the second side is attached to a plane of the support structure such that the side of the device is substantially perpendicular to the plane of the support structure. In the second mounting configuration, the third side is attached to the face of the device and the second side is attached to the plane of the support structure such that the face of the device is substantially parallel to the plane of the support structure.

In another embodiment, the present invention is an assembly comprising the device and the bracket described above.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
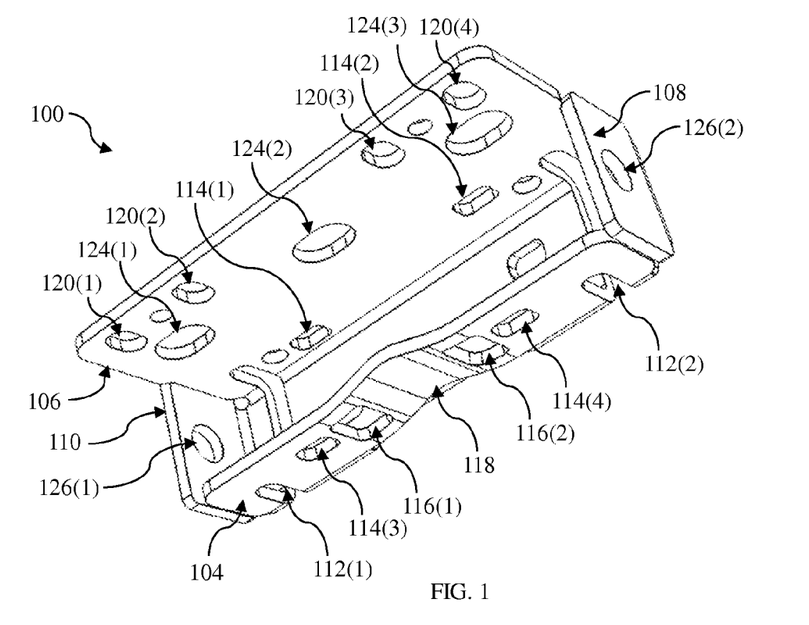
FIG. 1 shows a first perspective view of a mounting bracket according to one embodiment of the present invention.
Figure 2:
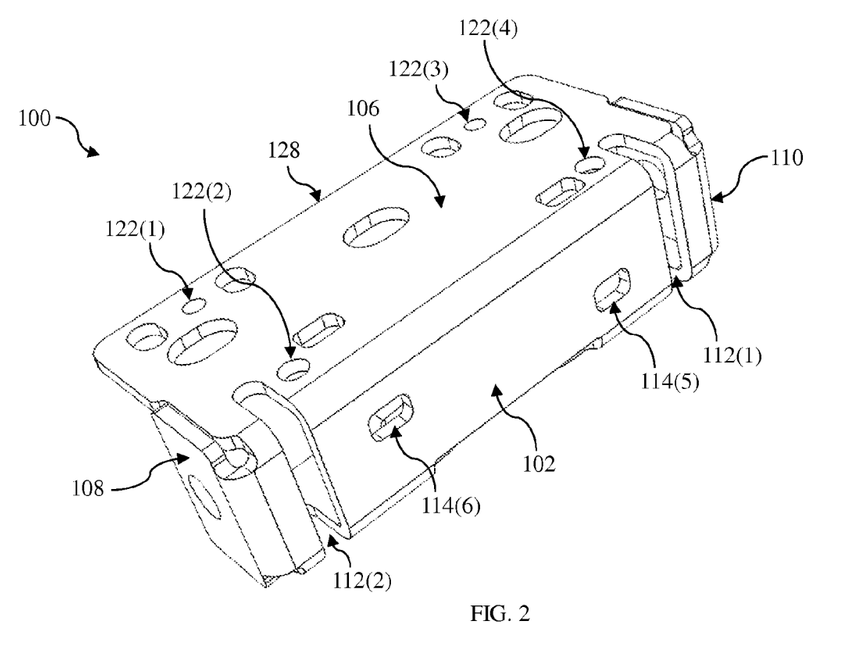
FIG. 2 shows a second perspective view of the mounting bracket of FIG. 1.

FIGS. 1 and 2 show first and second perspective views, respectively, of a mounting bracket 100 according to one embodiment of the present invention. Mounting bracket 100 may be constructed using metal, plastic, or any other material suitable for mounting a device (not shown in FIGS. 1 and 2) to support structure (also not shown in FIGS. 1 and 2). In this embodiment, mounting bracket 100 is formed by stamping out a substantially planar piece of material and then bending the substantially planar piece of material into the open box-like shape shown in FIGS. 1 and 2. As a result, mounting bracket 100 has (i) a substantially rectangular and elongated first planar side 102, (ii) substantially rectangular and elongated second and third planar sides 104 and 106, each of which extends from a different long edge of first side 102, and (iii) substantially rectangular fourth and fifth planar sides 108 and 110, each of which extends from a different short edge of first side 102.

Sides 104, 106, 108, and 110 all extend perpendicularly, and in the same direction, away from first side 102. The distal edge 128 of side 106 extends beyond the distal edges of sides 104, 108, and 110. Further, sides 102, 104, 106, 108, and 110 each have one or more apertures formed therein that support (i) the mounting of devices (not shown in FIGS. 1 and 2) to a variety of different mounting structures and (ii) the mounting of the devices in a variety of different mounting scenarios.

FIGS. 3-10 discussed below show a few of the many different mounting scenarios for which bracket 100 may be used. The features of bracket 100 and the potential uses of these features are described in further detail below in relation to FIGS. 3-10. For ease of illustration, the features of mounting bracket 100 are not labeled in FIGS. 3-10. Thus, for the following discussion, refer to FIGS. 1 and 2 for the labeling of the various features of bracket 100.

Figure 3:
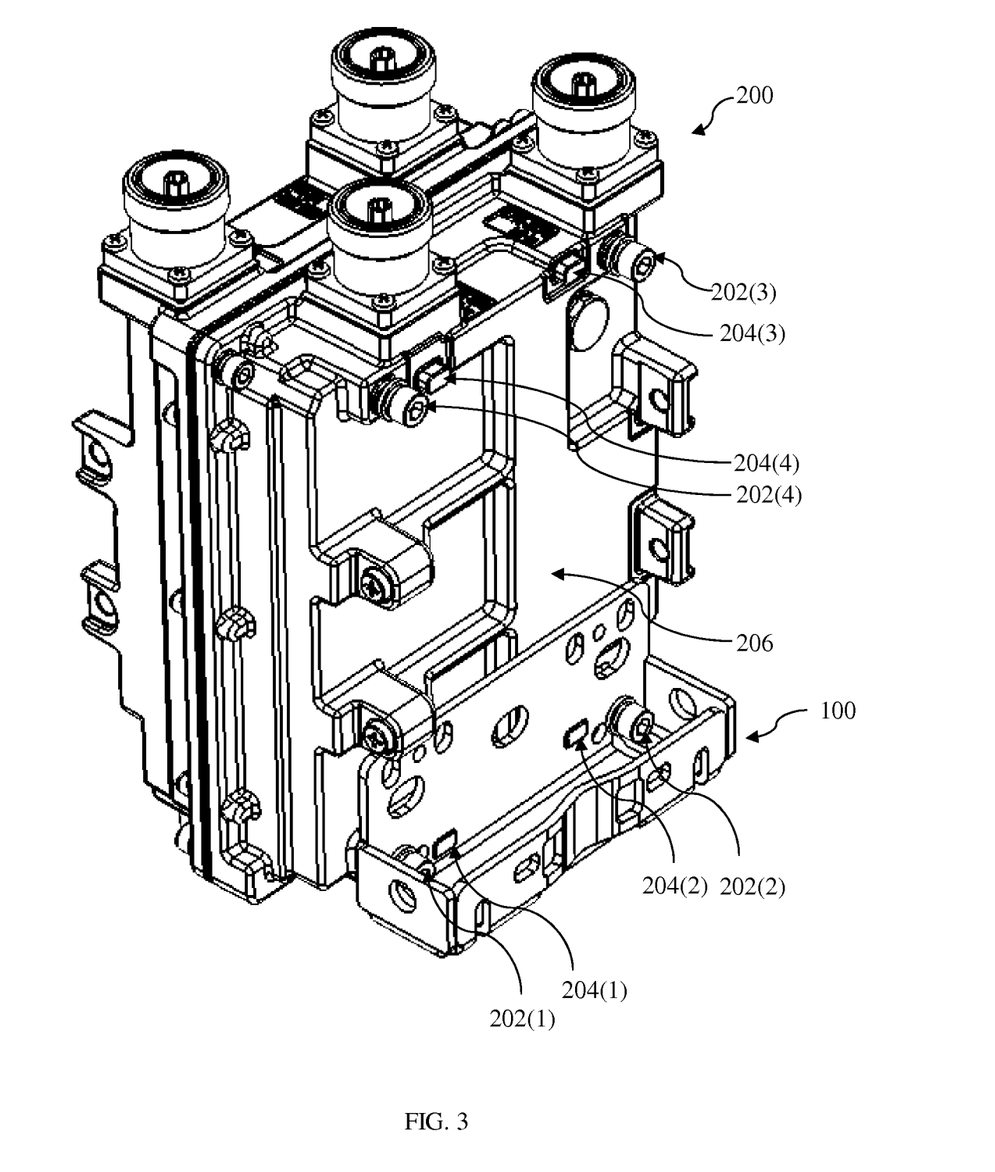
FIG. 3 shows a perspective view of the bracket of FIG. 1 installed on a device in a first orientation.

FIG. 3 shows a perspective view of bracket 100 installed on a device 200 in a first orientation. Device 200 may be a unit of radio-frequency (RF) ancillary equipment, including, but not limited to the types of ancillary equipment described in the background. Device 200 has a first pair of threaded fasteners 202(1) and 202(2) (e.g., bolts or screws) and a first pair of protrusions 204(1) and 204(2) that support the attachment of mounting bracket 100. Further, device 200 has a second pair of threaded fasteners 202(3) and 202(4) and a second pair of protrusions 204(3) and 204(4) that support the attachment of another instance of mounting bracket 100 (not shown).

To install bracket 100, protrusions 204(1) and 204(2) of device 200 are mated with bracket alignment apertures 114(1) and 114(2) of bracket 100, respectively. The mating of protrusions 204(1) and 204(2) with bracket-alignment apertures 114(1) and 114(2) prevents movement of bracket 100 relative to device 200 when fixed in the first orientation.

Bracket 100 is secured to device 200 by feeding threaded fasteners 202(1) and 202(2) into device-mounting apertures 112(1) and 112(2) of bracket 100, respectively, and tightening the fasteners into corresponding tapped holes in device 200 until side 106 of bracket 100 becomes entrapped between (i) the heads of threaded fasteners 202(1) and 202(2) and (ii) device 200.

Device-mounting apertures 112(1) and 112(2) of mounting bracket 100 are slots, each of which extends from side 104 across side 102 to side 106. In addition to being used to secure bracket 100 to device 200, slots 112(1) and 112(2) support the re-orientation of mounting bracket 100 once it is attached to device 200. For example, bracket 100 can be re-oriented by (i) backing out, without completely removing, threaded fasteners 202(1) and 202(2), (ii) rotating bracket 100 such that the treaded portions of threaded fasteners 202(1) and 202(2) are re-oriented within slots 112(1) and 112(2), respectively, to a different side of mounting bracket 100, and (iii) re-tightening threaded fasteners 202(1) and 202(2) such that bracket 100 is secured to device 200 in the new orientation.

Figure 5:
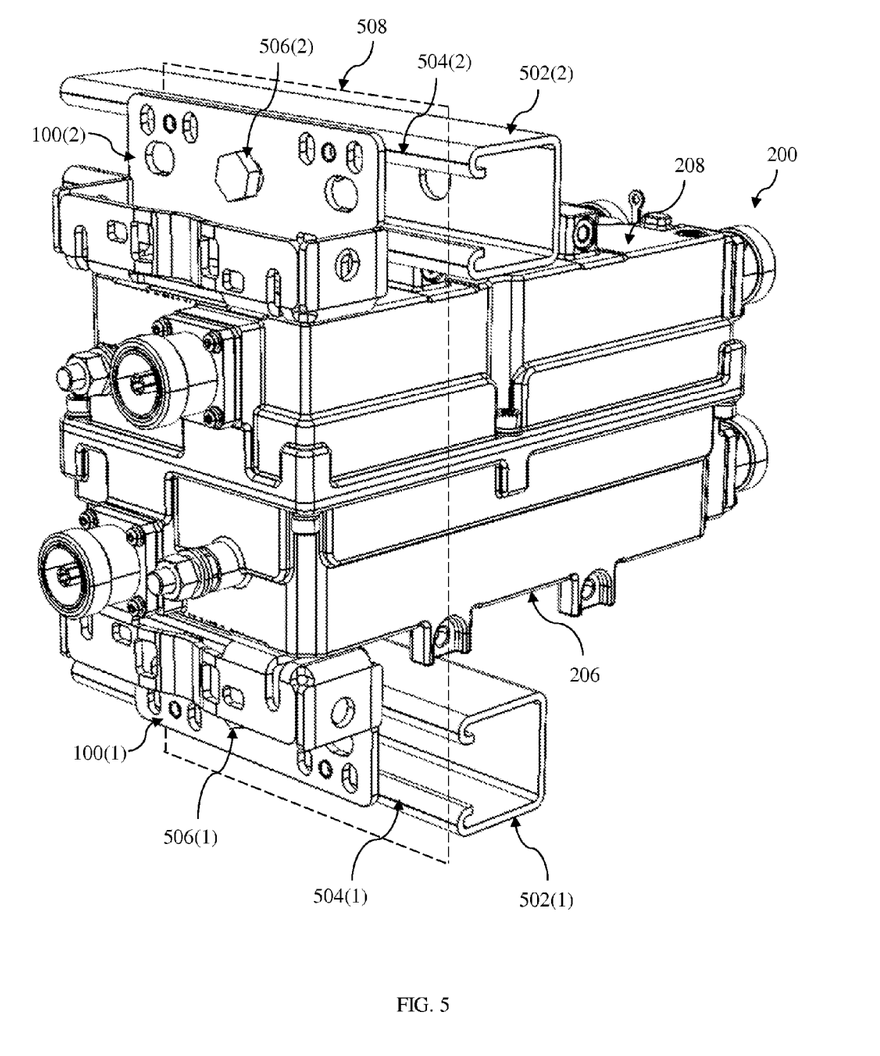
FIG. 5 shows a perspective view of a second configuration for mounting a device to support structure using the bracket of FIG. 1.
Figure 6:
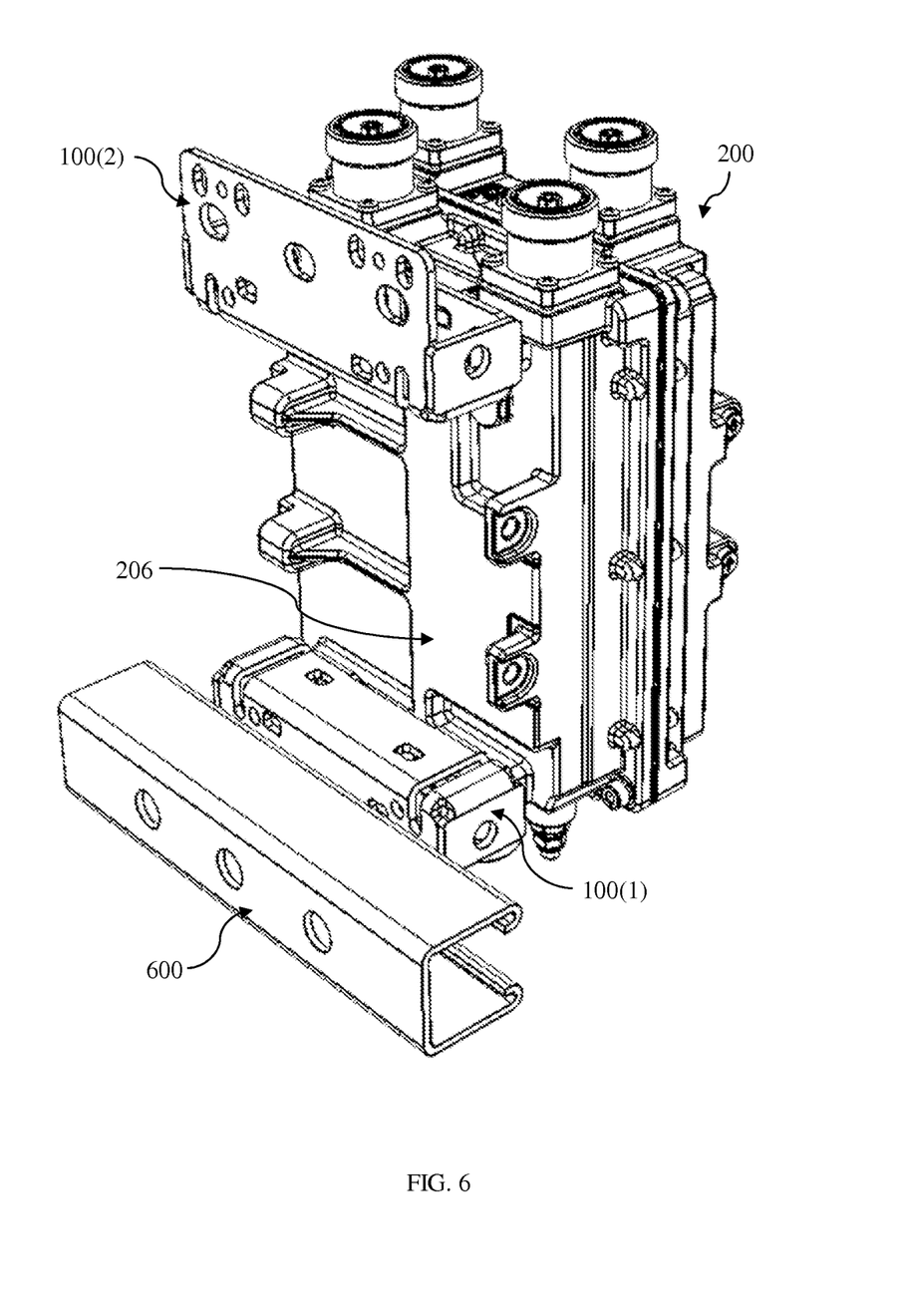
FIG. 6 shows a perspective view of a third configuration for mounting a device to support structure using the bracket of FIG. 1.

Thus, bracket 100 can be re-oriented into a second orientation (as shown in FIG. 5) without completely removing bracket 100 from device 200 such that (i) side 102 abuts device 200 and (ii) protrusions 204(1) and 204(2) of device 200 are mated with bracket alignment apertures 114(5) and 114(6) of bracket 100, respectively. Further, bracket 100 can be re-oriented into a third orientation (as shown in FIG. 6) without completely removing bracket 100 from device 200 such that (i) side 104 abuts device 200 and (ii) protrusions 204(1) and 204(2) of device 200 are mated with bracket alignment apertures 114(3) and 114(4) of bracket 100, respectively Re-orienting bracket 100 without completely removing threaded fasteners 202(1) and 202(2) avoids the need to separately handle multiple loose fastener items such as bolts, screws, nuts, and/or washers. This is especially advantageous when installation is performed at an elevated height, such as on a communications mast, a tower, or the like. Further, re-orienting bracket 100 enables bracket 100 to support mounting of device 200 to a variety of different mounting structures and in a variety of different mounting configurations as discussed below.

Figure 4:
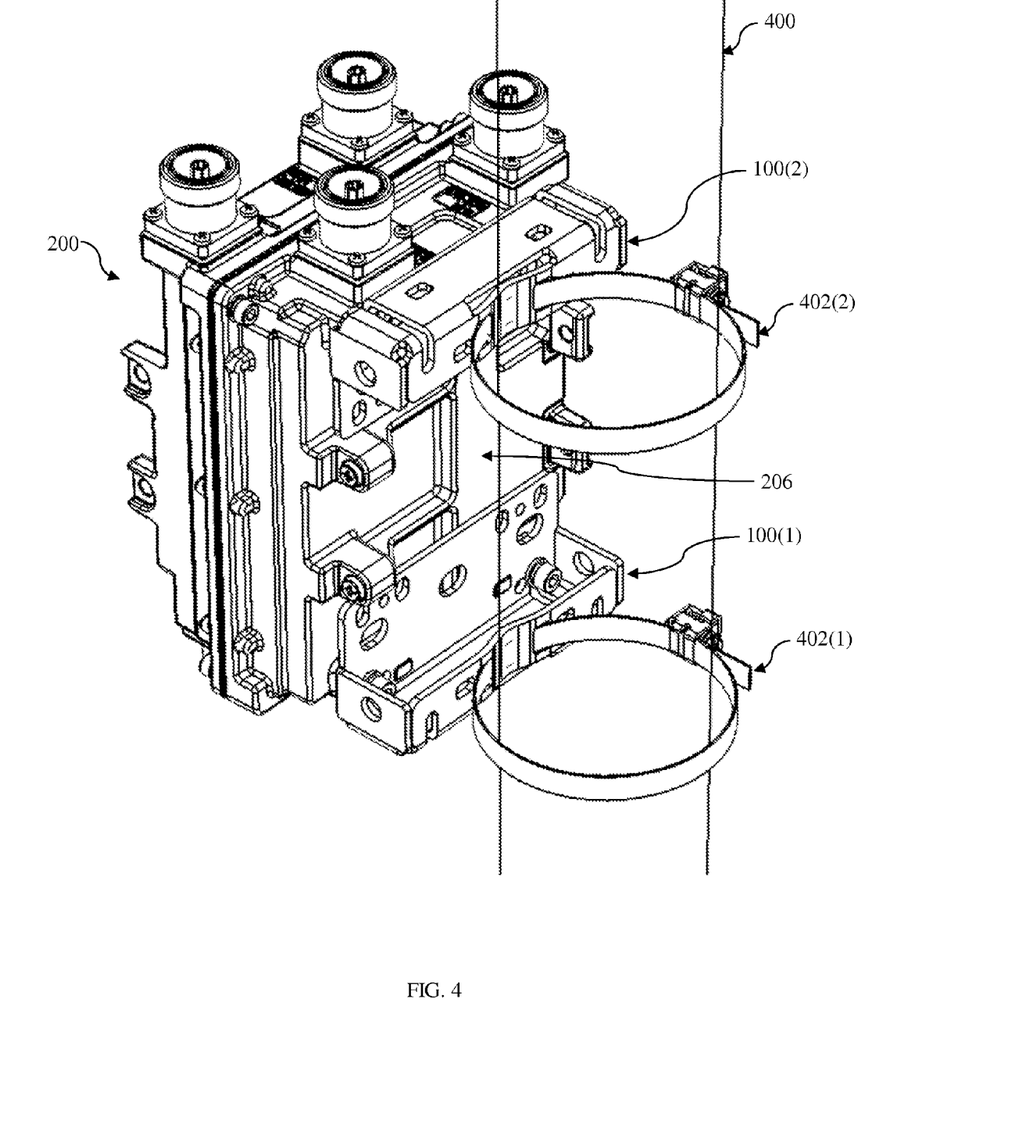
FIG. 4 shows a perspective view of a first configuration for mounting a device to support structure using the bracket of FIG. 1.

FIG. 4 shows a perspective view of a first configuration for mounting a device 200 to support structure. In this configuration, device 200 may be mounted to support structure such as a cylindrical pole 400 (or a pole having another shape) using first and second instances 100(1) and 100(2) of bracket 100, and first and second band clamps 402(1) and 402(2). Both instances 100(1) and 100(2) of bracket 100 are attached to the same face 206 of device 200, and both instances of bracket 100 are installed in the first orientation in a manner similar to that described above in relation to FIG. 3. As a result of this configuration, the longitudinal axis of pole 400 is substantially parallel to face 206 of device 200, when device 200 is mounted to pole 400.

Referring back to FIGS. 1 and 2, to support the mounting of device 200 onto pole 400, bracket 100 is designed such that side 104 has (i) two band-clamp apertures 116(1) and 116(2) formed therein that are configured to receive a band clamp and (ii) indentation 118 formed therein that is configured to mate with the outer curved surface of pole 400. Bracket 100 is secured to a pole such as pole 400 by inserting one end of a band clamp, for example, through band-clamp aperture 116(1), behind indentation 118, and out through band-clamp aperture 116(2). The band clamp is then wrapped around the pole; the two ends of the band-clamp are mated; and the band-clamp is tightened onto the pole.

FIG. 5 shows a perspective view of a second configuration for mounting device 200 to support structure. In this configuration, device 200 may be mounted to planar support structure such as a pair of framing channels 502(1) and 502(2) (e.g., C-channels) using first and second instances 100(1) and 100(2) of bracket 100. The first and second instances 100(1) and 100(2) of bracket 100 are attached to opposing faces 206 and 208 of device 200, respectively, and each instance is oriented in the second orientation discussed above, wherein side 102 abuts device 200. In this configuration, device 200 is mounted to a plane 508 (shown in dashed lines) formed by edges 504(1) and 504(2) of framing channels 502(1) and 502(2), respectively, wherein plane 508 is perpendicular to faces 206 and 208 of device 200.

Referring to FIGS. 1 and 2, to support the mounting of device 200 onto planar support structures, such as framing channels 502(1) and 502(2), or other planar surfaces, side 106 of bracket 100 has surface-mounting apertures 120(1)-(4) and surface-mounting apertures 124(1)-(3). Surface-mounting apertures 120(1)-(4) may be used for mounting to structures that are the same or different from the structures for which surface-mounting apertures 124(1)-(3) are used. For example, surface-mounting apertures 120(1)-(4) may be sized and positioned based on the dimensions of a standard equipment rack, while surface-mounting apertures 124(1)-(3) may be sized and positioned based on the dimensions of framing channels and fasteners that are commonly used on base-station sites. In FIG. 5, each instance of bracket 100 is secured to a framing channel (e.g., 502(1) or 502(2)) by feeding a male threaded fastener (e.g., 506(1) or 506(2)) (e.g., a bolt) through each of one or more of surface-mounting apertures 120(1)-(4) and 124(1)-(3), and into a corresponding female threaded fastener (not shown) (e.g., a tapped hole) residing in the corresponding framing channel.

FIG. 6 shows a perspective view of a third configuration for mounting device 200 to support structure. In this configuration, device 200 may be mounted to a plane formed by support structure such as a standard metal framing channel 600, a pair of standard metal framing channels (not shown), a wall (not shown), a ceiling (not shown) or any other suitable planar surface using first and second instances 100(1) and 100(2) of bracket 100. The first and second instances 100(1) and 100(2) of bracket 100 are attached to face 206 of device 200, and each instance is oriented in the third orientation discussed above, wherein side 104 abuts device 200. In this configuration, device 200 may be mounted to one or more planes that are parallel to face 206 of device 200. This is in contrast to the second configuration discussed above in relation to FIG. 5, which is used to mount device 200 to one or more planes that are perpendicular to face 206. Each instance of bracket 100 may be attached to the planar support structure by passing a bolt, screw, nail, rivet, or the like through one or more of surface-mounting apertures 120(1)-(4) and 124(1)-(3) into the planar surfaces.

Figure 7:
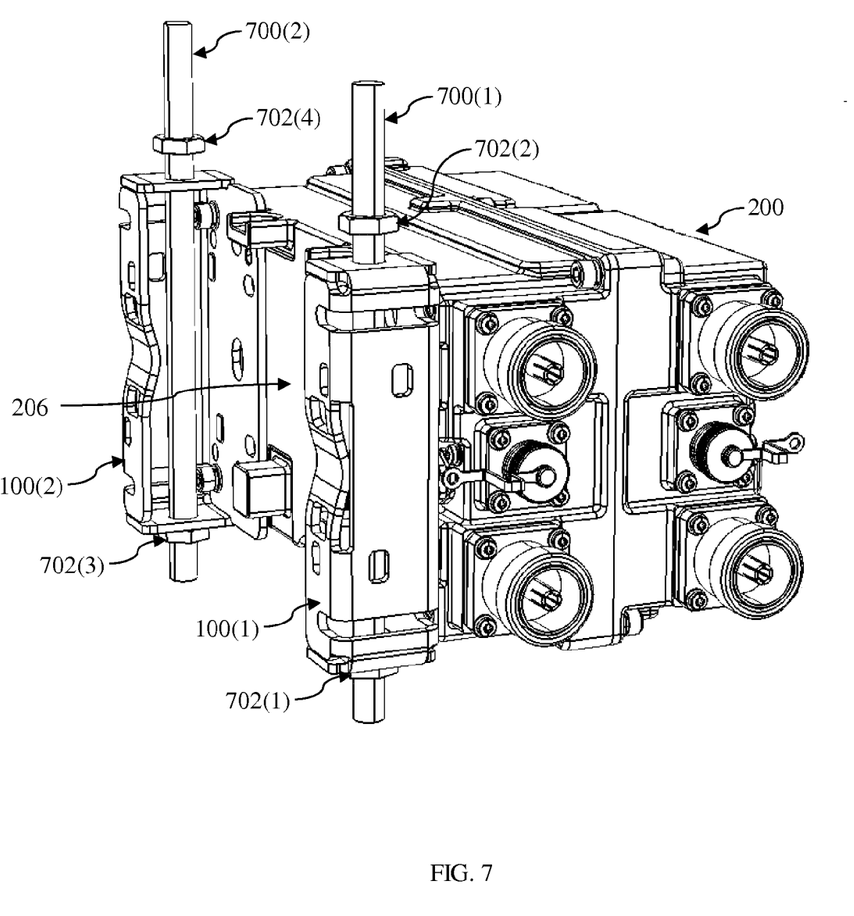
FIG. 7 shows a perspective view of a fourth configuration for mounting a device to support structure using the bracket of FIG. 1.
Figure 8:
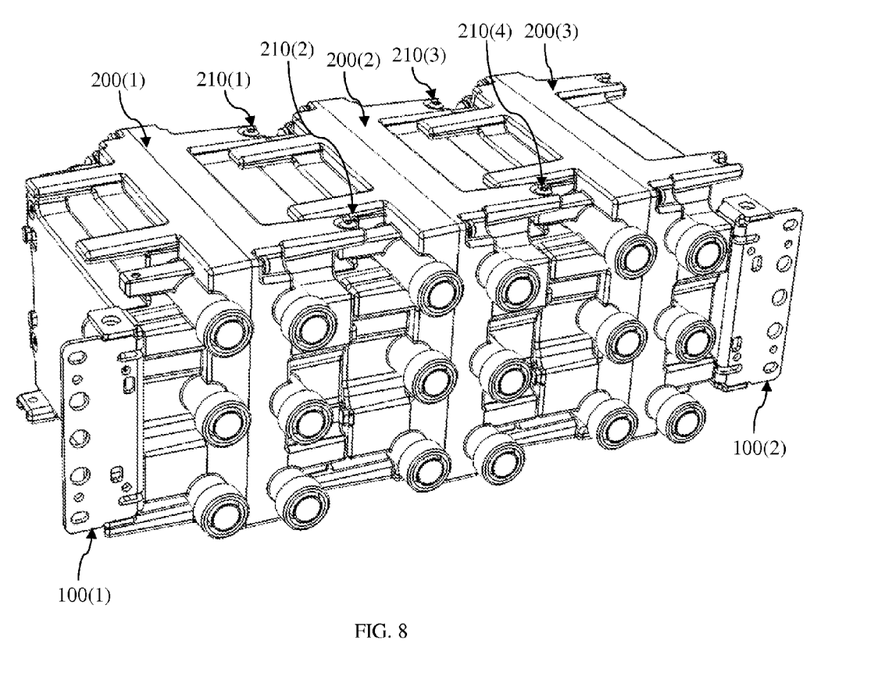
FIG. 8 shows a perspective view of a first configuration for mounting multiple stacked devices to support structure using the bracket of FIG. 1.

FIG. 7 shows a perspective view of a fourth configuration for mounting device 200 to support structure. In this configuration, device 200 may be mounted to support structure such as a pair of threaded rods 700(1) and 700(2) using first and second instances 100(1) and 100(2) of bracket 100. Threaded rods 700(1) and 700(2) may be attached to, for example, a cable ladder, icebridge, or other structure. The first and second instances 100(1) and 100(2) of bracket 100 are attached to face 206 of device 20, and each instance is oriented in the third orientation discussed above, wherein side 104 abuts device 200. However, for mounting to threaded rods 700(1) and 700(2), the first and second instances of bracket 100 may be oriented in any one of the first, second, and third orientations discussed above. In this configuration, device 200 is mounted to rods 700(1) and 700(2) such that the axes of the rods are parallel to the long edges of the instances of bracket 100.

Referring to FIGS. 1 and 2, to support the mounting of device 200 onto threaded rods 700(1) and 700(2), sides 108 and 110 of bracket 100 have (untapped) rod-mounting apertures 126(1) and 126(2) formed therein. Bracket 100 is installed onto a threaded rod by inserting the threaded rod through apertures 126(1) and 126(2). Then, bracket 100 can be fixed at a desired axial position along the rod using female threaded fasteners such as nuts 702(1)-(4) in FIG. 7.

Figure 11:
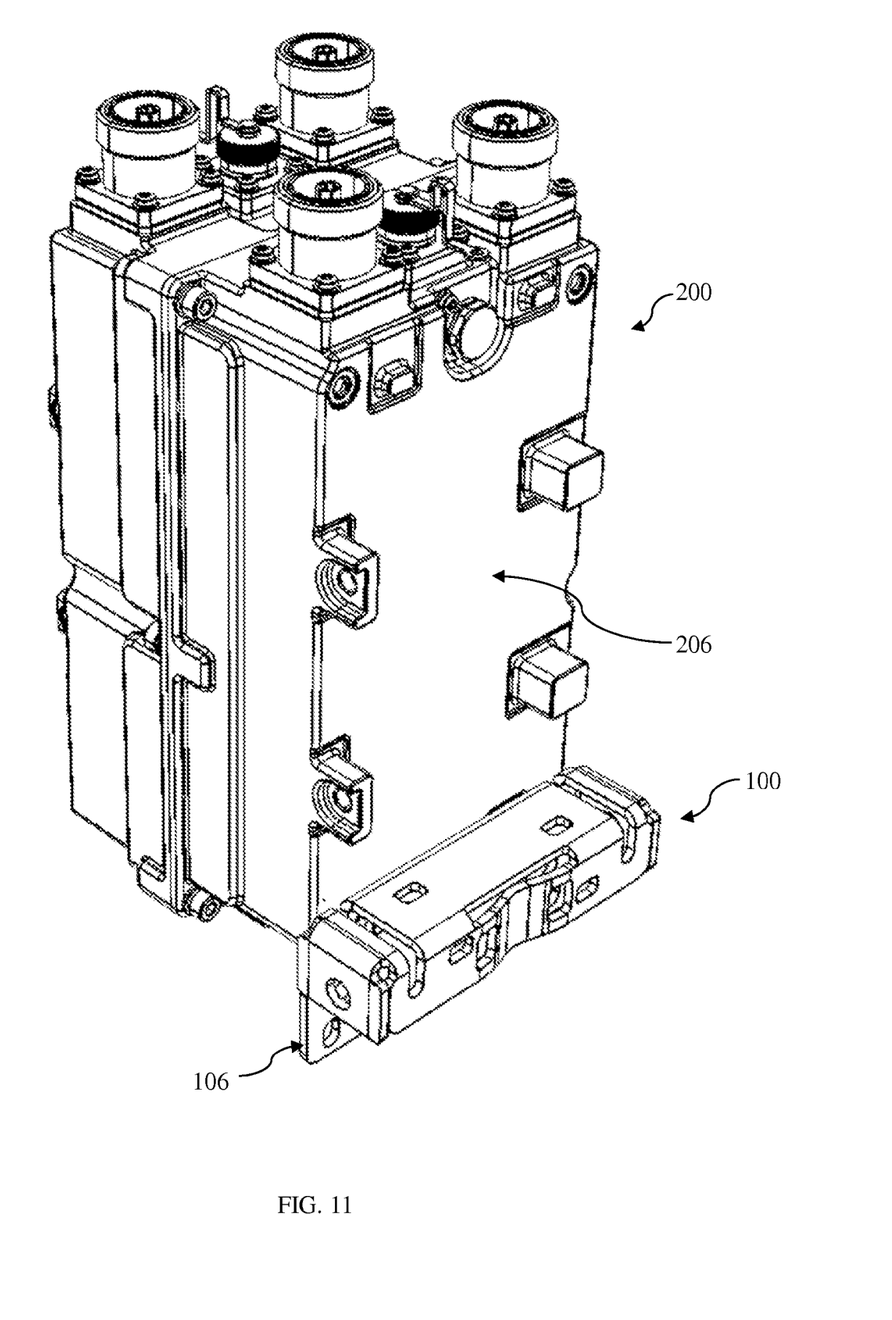
FIG. 11 shows a perspective view of the bracket of FIG. 1 installed on a device in a fourth orientation.
Figure 12:
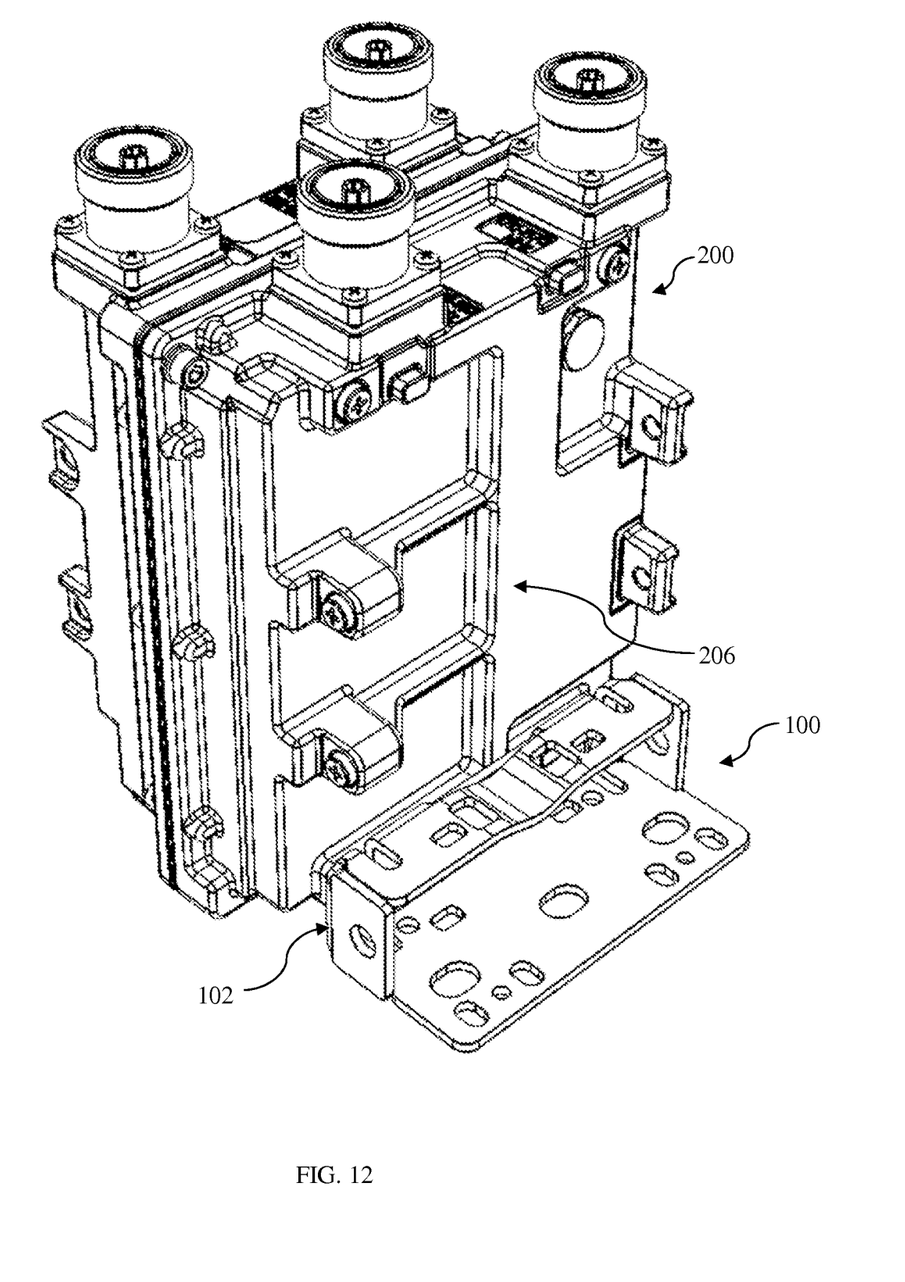
FIG. 12 shows a perspective view of the bracket of FIG. 1 installed on a device in a fifth orientation.
Figure 13:
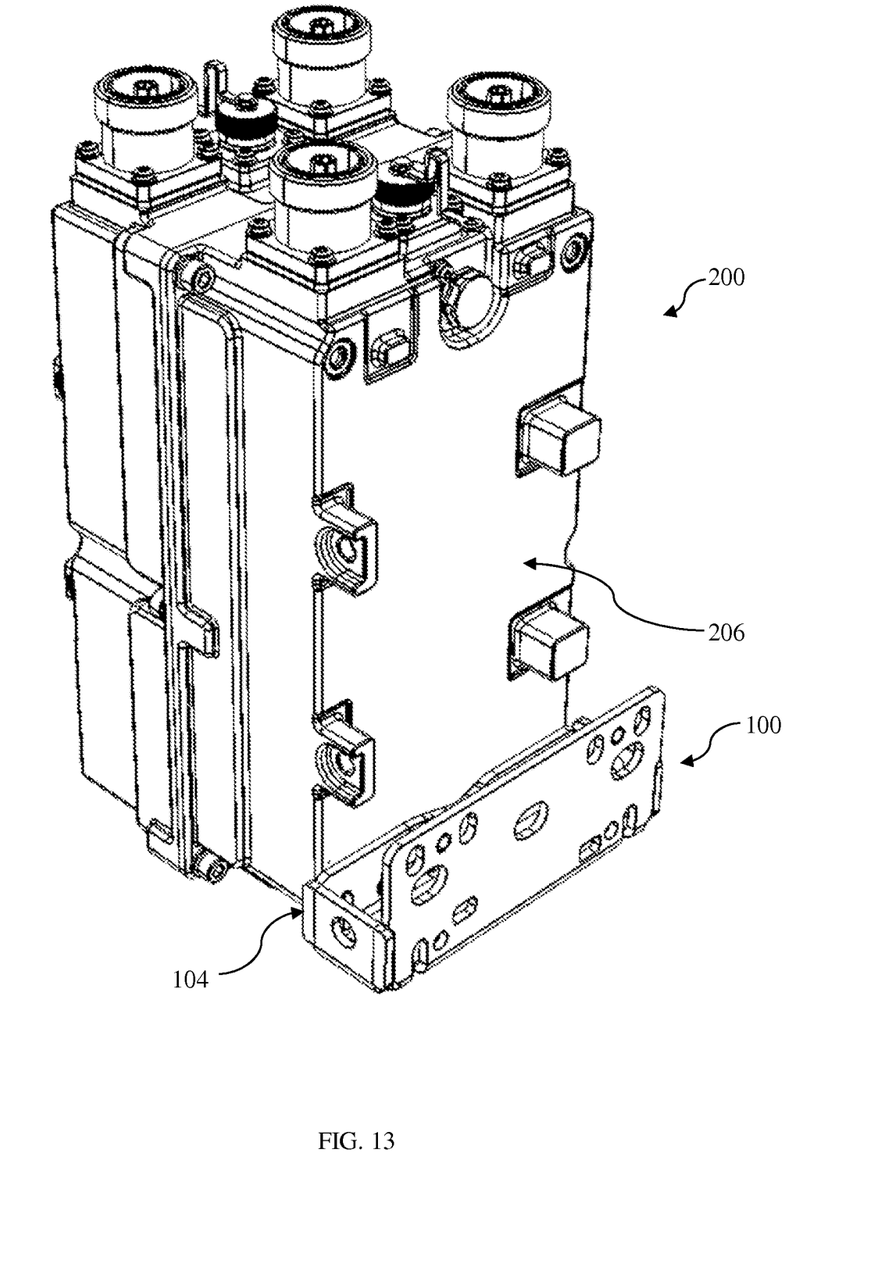
FIG. 13 shows a perspective view of the bracket of FIG. 1 installed on a device in a sixth orientation.

Bracket 100 can also support fourth through sixth configurations by flipping bracket 100 around, without changing the locations of fasteners 202(1) and 202(2), such that slot 112(1) is mated with threaded fastener 202(2), instead of threaded fastener 202(1), and slot 112(2) is mated with threaded fastener 202(1), instead of threaded fastener 202(2). In the fourth orientation (shown in FIG. 11), bracket 100 is configured such that (i) side 106 is abutted against device 200 and (ii) bracket alignment apertures 114(1) and 114(2) of bracket 100 are mated with protrusions 204(2) and 204(1) of device 200, respectively (see FIG. 3 for labeling of protrusions and FIGS. 1-2 for labeling of slots). From this fourth orientation, bracket 100 can be rotated, without completely removing fasteners 202(1) and 202(2), into the fifth orientation (shown in FIG. 12) such that (i) side 102 abuts the outer surface of device 200 and (ii) bracket alignment apertures 114(5) and 114(6) of bracket 100 mate with protrusions 204(2) and 204(1) of device 200, respectively. Further, from the fifth orientation, bracket 100 can be rotated into the sixth orientation (shown in FIG. 13) such that (i) side 104 abuts device 200 and (ii) bracket alignment apertures 114(3) and 114(4) of bracket 100 mate with protrusions 204(2) and 204(1) of device 200, respectively.

In some installation scenarios, it may be desirable to mount multiple devices together at a site location. The multiple devices can be stacked together, and one or more instances of bracket 100 may be used to mount the stacked devices. For example, consider FIG. 8, which shows a perspective view of a first configuration for mounting multiple stacked devices 200(1)-(3) to support structure (not shown). Devices 200(1)-(3) are fixed together using threaded fasteners 210(1)-(4). The stacked devices may be mounted to support structure using first and second instances 100(1) and 100(2) of bracket 100. Note that, in FIG. 8, the first and second instances 100(1) and 100(2) of bracket 100 are positioned in the fifth orientation discussed above. However, each instance may be positioned in any of the orientations described above to suit a desired mounting scenario.

In some installation scenarios, a single device or multiple stacked devices with one mounting bracket on each side does not fit the dimensions of supporting structure (e.g., the width of a rack in a cabinet). In that case, stacking multiple instances of bracket 100 as shown in FIGS. 9 and 10 may solve the problem.

Figure 9:
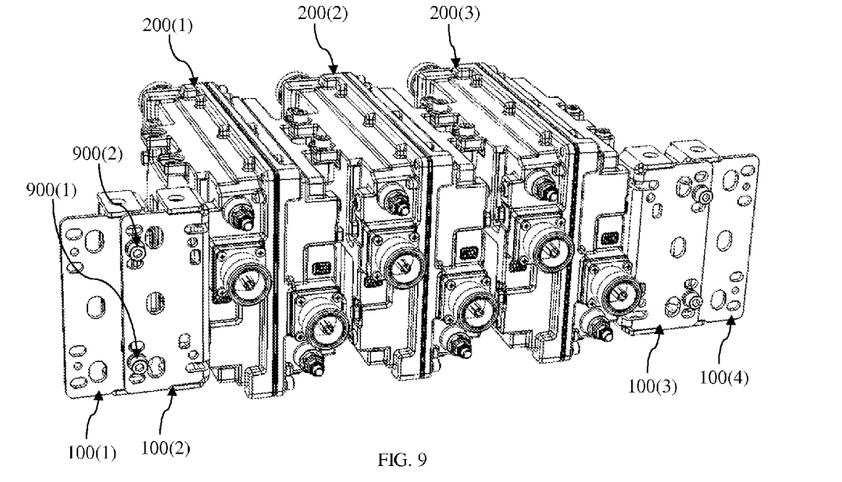
FIG. 9 shows a perspective view of a first configuration for mounting devices by stacking multiple instances of the bracket of FIG. 1.
Figure 10:
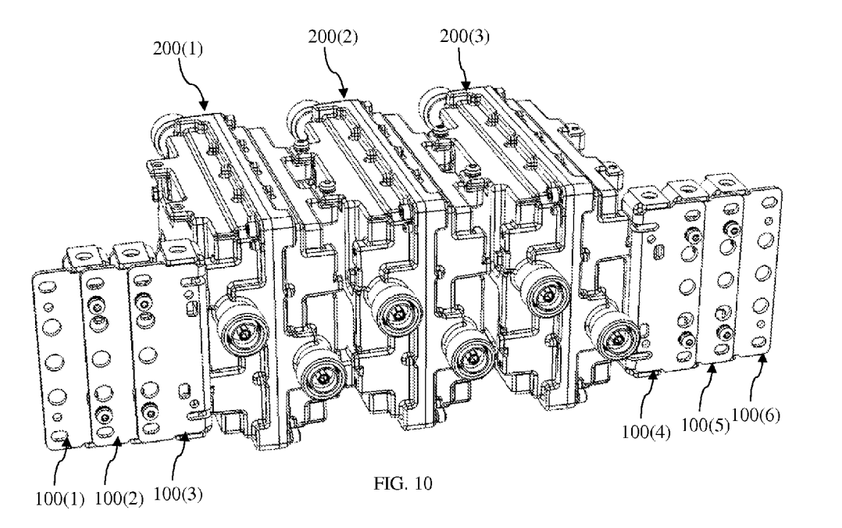
FIG. 10 shows a perspective view of a second configuration for mounting devices by stacking multiple instances of the bracket of FIG. 1.

FIGS. 9 and 10 show perspective views of first and second configurations for mounting devices by stacking multiple instances of bracket 100. In the embodiment of FIG. 9, three instances 200(1)-(3) of device 200 are stacked together. First and second instances 100(1) and 100(2) of bracket 100 are stacked on a first side of the stacked devices, and third and fourth instances 100(3) and 100(4) of bracket 100 are stacked on a second side of the stacked devices. Similarly, in the embodiment of FIG. 10, three instances 200(1)-(3) of device 200 are stacked together. However, three instances 100(1)-(3) of bracket 100 are stacked on the first side of the stacked devices, and three instances 100(4)-(6) of bracket 100 are stacked on the second side of the stacked devices.

To support stacking of multiple instances of bracket 100, bracket 100 has bracket-stacking apertures 122(1)-(4) as shown in FIGS. 1 and 2. Two instances (e.g., 100(1) and 100(2)) of bracket 100 may be stacked together by (i) feeding a first fastener (e.g., 900(1)) through bracket-stacking aperture 122(1) of the first instance of bracket 100 and bracket-stacking aperture 122(2) of the second instance of bracket 100 and (ii) feeding a second fastener (e.g., 900(2)) through bracket-stacking aperture 122(3) of the first instance of bracket 100 and bracket-stacking aperture 122(4) of the second instance of bracket 100.

Although FIGS. 9 and 10 each show an equal number of instances of bracket 100 on either side of the stacked devices, embodiments of the present invention are not so limited. According to alternative embodiments, the number of instances of bracket 100 may be different from one side to the next. Further, the orientations of the brackets on each side may vary depending on the mounting scenario.

Although bracket 100 is capable of supporting all of the mounting scenarios as described above, embodiments of the present invention are not so limited. Various embodiments of the invention may support fewer than or more than all of the mounting scenarios discussed above and combinations of mounting scenarios other than those described above. For example, brackets of the invention may be implemented without sides 108 and 110 such that mounting to rods is not enabled.

According to alternative embodiments of the invention, mounting brackets may have device-mounting apertures other than slots 112(1) and 112(2) of bracket 100 for attaching the brackets to devices such as device 200. For example, embodiments of the invention may have slots that extend across only two of the sides (e.g., 102 and 106 or 102 and 104). Alternatively, embodiments of the invention might not have slots that extend across sides at all. Rather, all three, or fewer than all three, sides might have their own device-mounting apertures for attaching to devices such as device 200, wherein the apertures are not adjoined. In such embodiments, the brackets cannot be rotated into alternative orientations without completely removing the threaded fasteners that secure the brackets to the devices.

Further, according to alternative embodiments of the invention, the number and locations of apertures formed therein may vary from those of bracket 100.

Yet further, various embodiments of the present invention may be manufactured in a manner that is different from that described above in relation to bracket 100. For example, embodiments of the invention may be machined from a block of material. Some such embodiments may also have a shape that is different from the open box-like shape of bracket 100. For example, brackets of the invention could have a closed box-like shape, wherein the area between sides 108 and 110 of bracket 100 is filled with material. In such embodiments, at least some of the apertures, such as rod mounting apertures 126(1) and 126(2), may be formed all the way through the closed box-like shape.

Even yet further, although bracket 100 has one side (i.e., 106) that extends beyond other sides (i.e., 104, 108, and 110), the present invention is not so limited. Alternative embodiments of the invention may have more than one side that extends beyond the box-like shape. For instance, rather than ending at side 106, side 102 may extend beyond side 106 and may support mounting to support structure that is perpendicular to side 106. Extending a side beyond the box-like shape is advantageous in that it permits easy access to the surface-mounting apertures formed thereon.

Although bracket 100 was shown as extending across the width of face 206 of device 200, embodiments of the invention are not so limited. According to alternative embodiments, brackets of the invention can extend across half, or less than half, of the width of face 206. For example, the long sides of bracket 100 could be shortened to half, or less than half, of the width of face 206. In order to accommodate the shortened size, these alternative embodiments may have fewer apertures than that of bracket 100. For example, in such embodiments, a bracket might have only a single slot such as slot 112(1) or 112(2) that is used to attach the bracket to a device such as device 200. Thus, in FIG. 3, a first instance of such bracket could be attached using threaded fastener 202(1) and a second instance of such bracket could be attached, independent of the first instance, using threaded fastener 202(2). As a result, rod-mounting aperture 126(2) of the first instance would align with rod-mounting aperture 126(1) of the second instance.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An assembly comprising: a device having a face comprising a plurality of attachment structures; and
a bracket configured to mount the device to a support structure, the bracket comprising:
a first side having a first set of attachment apertures corresponding to a first subset of the plurality of attachment structures;
a second side extending substantially perpendicularly from a first edge of the first side in a first direction; and
a third side having a third set of attachment apertures corresponding to the first subset of the plurality of attachment structures, extending substantially perpendicularly from a second edge of the first side, opposite the first edge, and in the first direction, such that the third side is substantially parallel to the second side,
wherein the bracket is configured to support at least first and second mounting configurations of the device to the support structure;
wherein in the first mounting configuration, the first side is attached to the first subset of the plurality of attachment structures of the face of the device using the first set of attachment apertures and the second side is attached to the support structure such that the face of the device is in a first orientation relative to horizontal;

wherein in the second mounting configuration, the third side is attached to the first subset of the plurality of attachment structures of the face of the device using the third set of attachment apertures and the second side is attached to the support structure in a second orientation of the face relative to horizontal that is perpendicular to the first orientation of the face;

wherein the second side has a second set of attachment apertures corresponding to the first subset of the plurality of attachment structures;

wherein respective ones of each of the first, second and third sets of attachment apertures together form a slot extending in the first, second, and third sides of the bracket; and wherein the slot is configured to support rotating of the bracket to selectively attach the first, second, or third side of the bracket to the first subset of the plurality of attachment structures of the device without completely removing the bracket from the device.

2. The assembly of claim 1, wherein:
the support structure is a pole having a longitudinal axis;
in the first mounting configuration, the face of the device is substantially perpendicular to the longitudinal axis;
in the second mounting configuration, the face of the device is substantially parallel to the longitudinal axis; and
at least one of the second side and the third side of the bracket is configured to support mounting of the device to a pole.

3. The assembly of claim 1, wherein the bracket further comprises a fourth side extending substantially perpendicularly from the first side and substantially perpendicularly from the second and third sides, wherein the fourth side has a rod receiving aperture formed therein configured to receive a rod for mounting the device to the rod.

4. The assembly of claim 3, wherein the bracket further comprises a fifth side extending substantially perpendicularly from the first side, substantially perpendicularly from the second and third sides, and substantially parallel to the fourth side, wherein the fifth side has a rod receiving aperture formed therein aligned with the rod receiving aperture in the fourth side and configured to receive the rod for mounting the device to the rod.

5. The assembly of claim 1, wherein the bracket is configured to support stacking of multiple instances of the bracket to each other.

6. The assembly of claim 1, wherein: the device is a unit of radio-frequency (RF) ancillary equipment; and the bracket is configured to mount the unit of RF ancillary equipment to the support structure.

7. The assembly of claim 1, wherein the device comprises a first device and further comprising one or more other devices, wherein the bracket is configured to mount the first device to the support structure along with the one or more other devices stacked to the first device.

8. An assembly comprising: a device having a face comprising a plurality of attachment structures; and
a bracket configured to mount the device to a pole having a longitudinal axis, the bracket comprising:
a first side having a first set of attachment apertures corresponding to a first subset of the plurality of attachment structures;
a second side extending substantially perpendicularly from a first edge of the first side in a first direction; and
a third side having a third set of attachment apertures corresponding to the first subset of the plurality of attachment structures, extending substantially perpendicularly from a second edge of the first side, opposite the first edge, and in the first direction, such that the third side is substantially parallel to the second side, wherein the bracket is configured to support at least first and second mounting configurations of the device to the pole;

wherein in the first mounting configuration, the first side is attached to the first subset of the plurality of attachment structures of the face of the device using the first set of attachment apertures and the second side is attached to the pole such that the face of the device is in a first orientation relative to horizontal and substantially perpendicular to the longitudinal axis of the pole;

wherein in the second mounting configuration, the third side is attached to the first subset of the plurality of attachment structures of the face of the device using the third set of attachment apertures and the second side is attached to the pole in a second orientation of the face of the device relative to horizontal that is perpendicular to the first orientation of the face of the device, with the face of the device substantially parallel to the longitudinal axis of the pole;

wherein the second side has a second set of attachment apertures corresponding to the first subset of the plurality of attachment structures;

wherein respective ones of each of the first, second and third sets of attachment apertures together form a slot extending in the first, second, and third sides of the bracket;

wherein the slot is configured to support rotating of the bracket to selectively attach the first, second, or third side to the first subset of the plurality of attachment structures of the device without completely removing the bracket from the device; and wherein the device is a unit of radio-frequency (RF) ancillary equipment; and the bracket is configured to mount the unit of RF ancillary equipment to the pole.

9. The assembly of claim 8, wherein the bracket further comprises a fourth side, extending substantially perpendicularly from the first side and substantially perpendicularly from the second and third sides, wherein the fourth side has a rod receiving aperture formed therein configured to receive a rod for mounting the device to the rod.

10. The assembly of claim 9, wherein the bracket further comprises a fifth side extending substantially perpendicularly from the first side, substantially perpendicularly from the second and third sides, and extending substantially parallel to the fourth side, wherein the fifth side has an rod receiving aperture formed therein aligned with the rod receiving aperture in the fourth side and configured to receive the rod for mounting the device to the rod.

11. The assembly of claim 8, wherein the bracket is configured to support stacking of multiple instances of the bracket to each other.

* * * * *